(12) United States Patent
Busse et al.

(10) Patent No.: US 9,209,534 B2
(45) Date of Patent: Dec. 8, 2015

(54) DISTRIBUTOR UNIT AND DISTRIBUTOR BLOCK WHICH COMPRISES AT LEAST TWO DISTRIBUTOR UNITS

(75) Inventors: Ralf-Dieter Busse, Hoppegarten (DE); Heiko Neumetzler, Berlin (DE); Joachim Stark, Berlin (DE); Philipp Meyer, Berlin (DE)

(73) Assignee: CommScope Technologies LLC, Hickory, NC (US)

( * ) Notice: Subject to any disclaimer, the term of this patent is extended or adjusted under 35 U.S.C. 154(b) by 71 days.

(21) Appl. No.: 14/116,685

(22) PCT Filed: Mar. 28, 2012

(86) PCT No.: PCT/EP2012/001343
§ 371 (c)(1),
(2), (4) Date: Jan. 27, 2014

(87) PCT Pub. No.: WO2012/156005
PCT Pub. Date: Nov. 22, 2012

(65) Prior Publication Data
US 2014/0213096 A1    Jul. 31, 2014

(30) Foreign Application Priority Data
May 17, 2011 (DE) .......................... 10 2011 101 729

(51) Int. Cl.
*H01R 9/24*   (2006.01)
*H01R 4/24*   (2006.01)
*H01R 9/26*   (2006.01)
*H04Q 1/14*   (2006.01)

(52) U.S. Cl.
CPC ................ *H01R 9/24* (2013.01); *H01R 4/242* (2013.01); *H01R 9/2641* (2013.01); *H04Q 1/142* (2013.01)

(58) Field of Classification Search
CPC ............. H01R 13/6658; H01R 4/2429; H01R 9/0757; H01R 23/025; H01R 13/658
See application file for complete search history.

(56) References Cited

U.S. PATENT DOCUMENTS 5,800,125 A * 9/1998 Largillier et al. ........... 416/96 R
6,142,817 A * 11/2000 Lee .............................. 439/395

(Continued)

FOREIGN PATENT DOCUMENTS

| CA | 1325714 | 1/1994 |
|---|---|---|
| DE | 195 37 529 | 3/1997 |

(Continued)

OTHER PUBLICATIONS

International Search Report for International Application No. PCT/EP2012/001343 mailed Sep. 28, 2012 (4 pages).

*Primary Examiner* — Gary Paumen
(74) *Attorney, Agent, or Firm* — Merchant & Gould P.C.

(57) ABSTRACT

The invention relates to a distribution strip (1) for telecommunications and data technology, comprising a housing (2) and connection contacts for cores, the distribution strip (1) having a front side (5) and a rear side (6), with connection contacts being accessible both from the front side (5) and from the rear side (6), the connection contacts on the front side (5) being electrically connected to the connection contacts on the rear side (6), at least the connection contacts on the front side (5) being in the form of core connection contacts (11), the core connection contacts (11) on the front side (5) being arranged laterally offset with respect to a side face (7, 8) of the housing (2) and extending at most as far as half the width (B) of the front side (5), and to a distribution block (50) comprising at least two distribution strips (1), which are fastened on a carrier system (6).

16 Claims, 8 Drawing Sheets

(56) References Cited

U.S. PATENT DOCUMENTS

| | | |
|---|---|---|
| 7,407,389 B2 | 8/2008 | Busse et al. |
| 8,152,558 B2 * | 4/2012 | Broeksteeg et al. .......... 439/378 |
| 8,272,878 B2 | 9/2012 | Neumetzler |
| 2003/0156389 A1 * | 8/2003 | Busse et al. .................. 361/736 |
| 2006/0286824 A1 * | 12/2006 | Busse et al. ..................... 439/65 |
| 2007/0285879 A1 | 12/2007 | Busse et al. |
| 2010/0221946 A1 * | 9/2010 | Neumetzler et al. .......... 439/405 |
| 2011/0256765 A1 | 10/2011 | Truskett et al. |

FOREIGN PATENT DOCUMENTS

| | | |
|---|---|---|
| DE | 100 29 649 | 1/2002 |
| DE | 103 39 844 | 1/2005 |
| DE | 10 2008 033 430 | 1/2010 |
| EP | 0 200 883 | 12/1986 |
| EP | 0 329 917 | 8/1989 |
| EP | 0 664 582 | 7/1995 |
| WO | WO 2010/043356 | 4/2010 |

* cited by examiner

DISTRIBUTOR UNIT AND DISTRIBUTOR BLOCK WHICH COMPRISES AT LEAST TWO DISTRIBUTOR UNITS

This application is a National Stage Application of PCT/EP2012/001343, filed 28 Mar. 2012, which claims benefit of Serial No. 10 2011 101 729.5, filed 17 May 2011 in Germany and which applications are incorporated herein by reference. To the extent appropriate, a claim of priority is made to each of the above disclosed applications.

The invention relates to a distribution strip and a distribution block comprising at least two distribution strips, which are fastened on a carrier system.

DE 100 29 649 A1 has disclosed a distribution connection module, comprising a housing, in which input and output contacts for connecting lines or cores are arranged so as to be accessible from the outside, the housing being formed with a cavity, in which functional elements are arranged between the input and output contacts. In this case, the functional elements are arranged on at least one printed circuit board, which is supported in the housing. The input and output contacts are in this case in the form of core connection contacts in the form of insulation displacement contacts, for example, the input and output contacts preferably being arranged on opposite end sides of the housing. Said document furthermore proposes that in each case one disconnecting contact is arranged between an input and output contact, said disconnecting contact being accessible from the outside.

EP 0 329 917 A1 has disclosed a tool for connecting cable cores to insulation displacement contacts, by means of which the insulation displacement contacts from DE 100 29 649 A1 can also be connected. Owing to the size of the ram head of the tool, a minimum spacing between insulation displacement contacts arranged one behind below the other is required.

The invention is based on the technical problem of providing a distribution strip and a distribution block comprising such distribution strips, said distribution block having a high packing density and at the same time enabling simple connectability. A further technical problem consists in providing a particularly flat distribution strip.

The solution to the technical problem results from the subjects having the features of claims 1, 9 and 10. Further advantageous configurations of the invention result from the dependent claims.

In this regard, the distribution strip comprises a housing and connection contacts for cores, the distribution strip having a front side and a rear side, with connection contacts being accessible both from the front side and from the rear side, the connection contacts on the front side being electrically connected to the connection contacts on the rear side, at least the connection contacts on the front side being in the form of core connection contacts, the core connection contacts on the front side being arranged laterally offset with respect to a side face of the housing and extending at most as far as half the width of the front side. Correspondingly, a distribution block comprising at least two such distribution strips, which are fastened one below the other in a carrier system, can then be constructed, the core connection contacts being arranged alternately on the left or right. As a result, there is in each case twice the height available during wiring, with the result that the core connection contacts can be connected using conventional wiring tools, such as are known from EP 0 329 917 A, for example. The space remaining to the side of the core connection contacts on the front side can be used if necessary for different purposes, for example as a labeling area, for optical signaling purposes, for example with LEDs, or with further contacts for measurement and/or test purposes. Furthermore, this free space can also be used as an area for guiding cables and cores in order to guide cores coming from the rear side or from the side to the front side. Preferably, the distribution strip is used for connecting eight twin cores on the front side. In a preferred embodiment, the distribution strip is 130 mm wide and 10 mm high, with the result that, correspondingly, the core connection contacts take up a maximum width of 65 mm. The core connection contacts on the front side and the connection contacts on the rear side can in this case also be in the form of integral contact elements.

Preferably, the core connection contacts on the front side are in the form of insulation displacement contacts.

In a further embodiment, the connection contacts on the rear side are likewise in the form of core connection contacts. In this case, core connection contacts mean contacts which are used to connect individual cores, in contrast to plug-type connectors which can be used to simultaneously connect preferably a plurality of cores. Such a plug-type connector is, for example, an RJ45 plug-type connector or a coaxial plug-type connector. The core connection contacts are preferably insulation displacement contacts or wire-wrap contacts.

In a further embodiment, the connection contacts on the rear side are arranged symmetrically with respect to the side faces of the housing. Further preferably, the rear side is narrower than the front side. Further preferably, the housing has a T shape.

In a further embodiment, a printed circuit board is arranged in the housing, with the core connection contacts on the front side and the connection contacts on the rear side being electrically connected to one another via said printed circuit board.

In a further embodiment, the printed circuit board is arranged centrally in the housing. As a result, the contacts for making contact with the printed circuit board can likewise be arranged centrally, i.e. said contacts do not need to be bent back starting from the core connection contacts. In this case, the mid-axis of the core connection contacts, in particular of the insulation displacement contacts, is on the central plane of the printed circuit board.

In a further preferred embodiment, the core connection contacts on the front side and/or the connection contacts on the rear side are connected to the printed circuit board via fork contacts. In this case, the core connection contacts and the fork contacts can each be in the form of integral contact elements, which are then arranged in a separate housing and form a printed circuit board plug-type connector. In this case, provision can also be made for the contact elements to be arranged in the further housing such that they cannot fall out. Therefore, the printed circuit board plug-type connector can be connected separately and the connected printed circuit board plug-type connector then plugged onto the printed circuit board.

In a further embodiment, functional elements are arranged on the printed circuit board, said functional elements being arranged in slots in the printed circuit board. In particular in the case of the central arrangement of the printed circuit board, the physical height can then be distributed uniformly above and below the printed circuit board. Preferably, the width of the slot is as wide as possible, without it being possible for the functional element to slide through, taking manufacturing tolerances into consideration. Preferably, the width of the slot is at least 80% of the diameter of the functional element, further preferably at least 85%, further preferably at least 90%. The functional element is preferably a surge arrester with a failsafe contact. Further preferably in this case, the failsafe contact is arranged on that side of the surge arrester which passes through into the printed circuit board, with the result that the distribution of the physical height above and below the printed circuit board is virtually uniform. Thus, the distribution strip can be designed to be very flat despite integrated functional elements.

Irrespective of the lateral offset of the core connection contacts, the invention therefore also claims a distribution strip, comprising a housing and connection contacts for cores, the distribution strip having a front side and a rear side, with connection contacts being accessible both from the front side and from the rear side, the connection contacts on the front side being electrically connected to the connection contacts on the rear side, at least the connection contacts on the front side being in the form of core connection contacts, a printed circuit board with functional elements being arranged in the housing, at least the core connection contacts on the front side being parts of contact elements of a printed circuit board plug-type connector, the contact elements each having at least one fork contact, the printed circuit board being arranged centrally in the housing, the functional elements being arranged in slots in the printed circuit board, the width of the slots being at least 80% of the diameter of the preferably cylindrical functional elements.

The invention will be explained in more detail below with reference to a preferred exemplary embodiment. In the figures.

Figure 3:
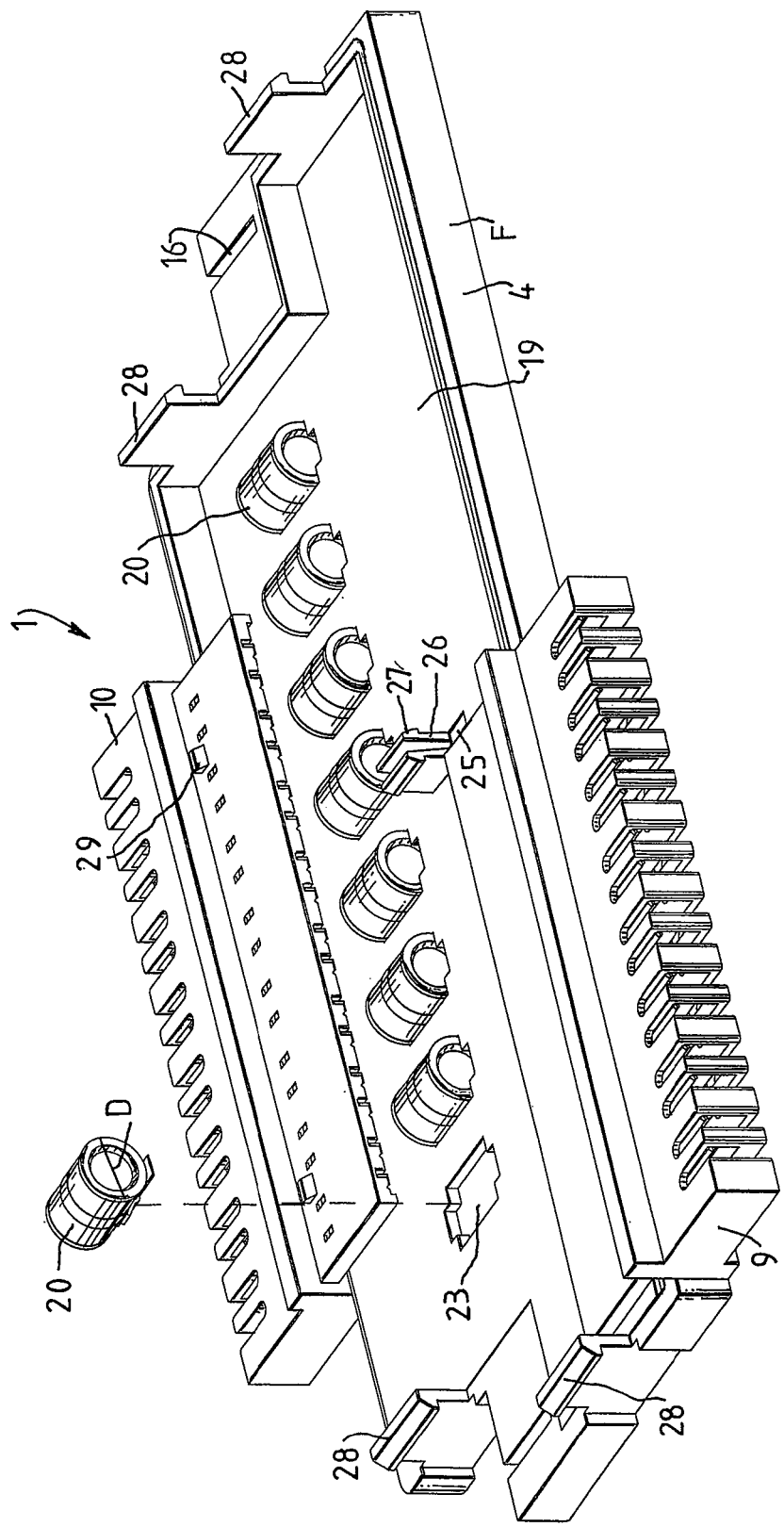
Figure 4:
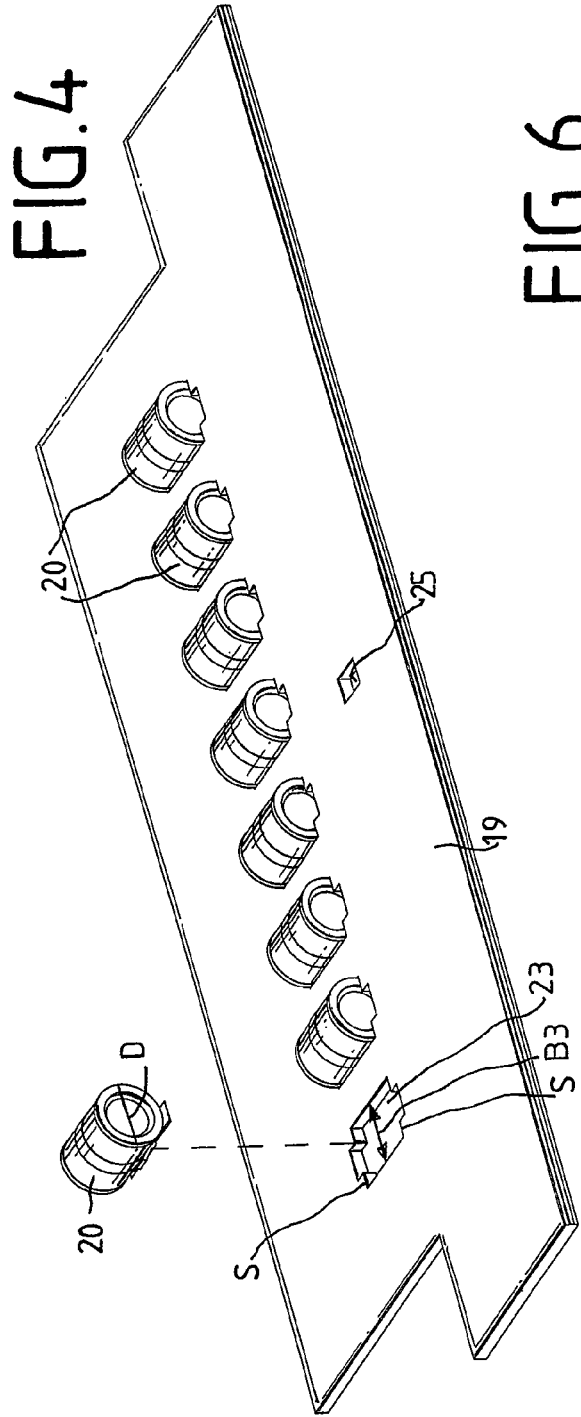
Figure 6:
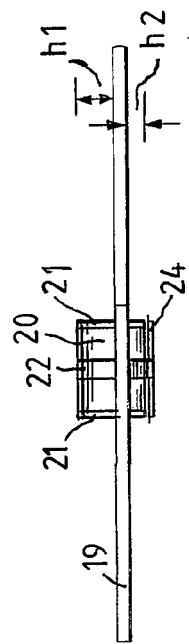
Figure 7:
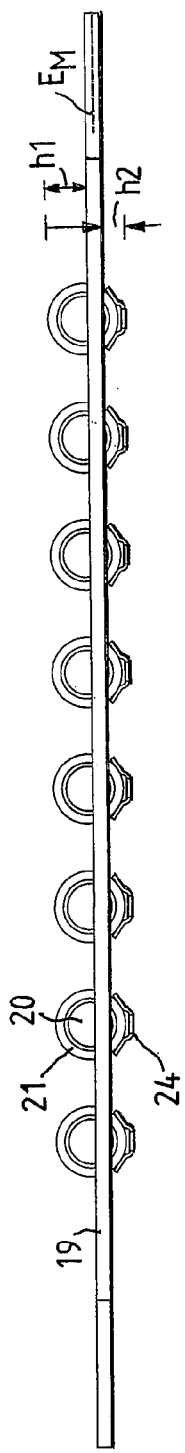
Figure 5:
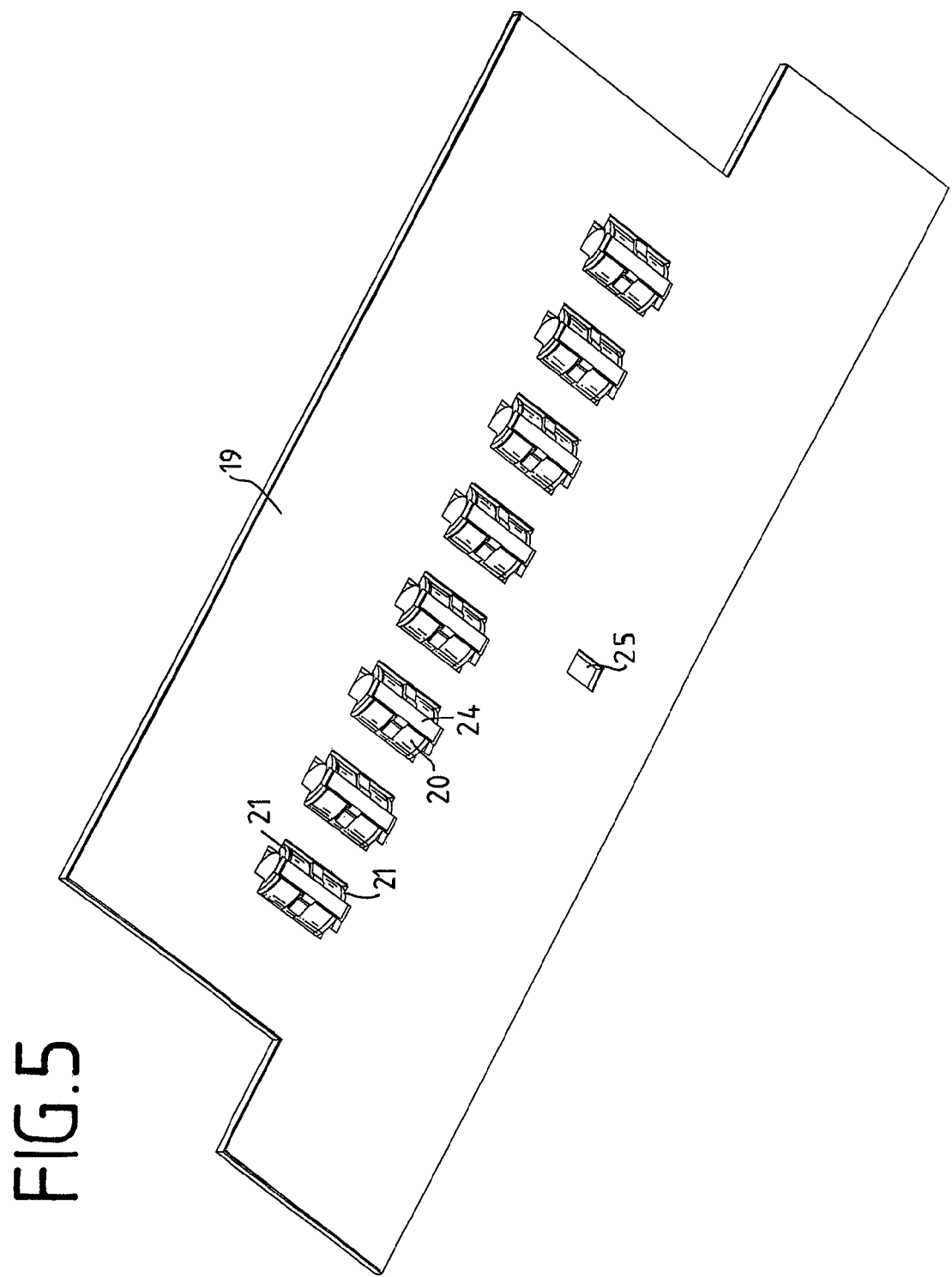
Figure 8:
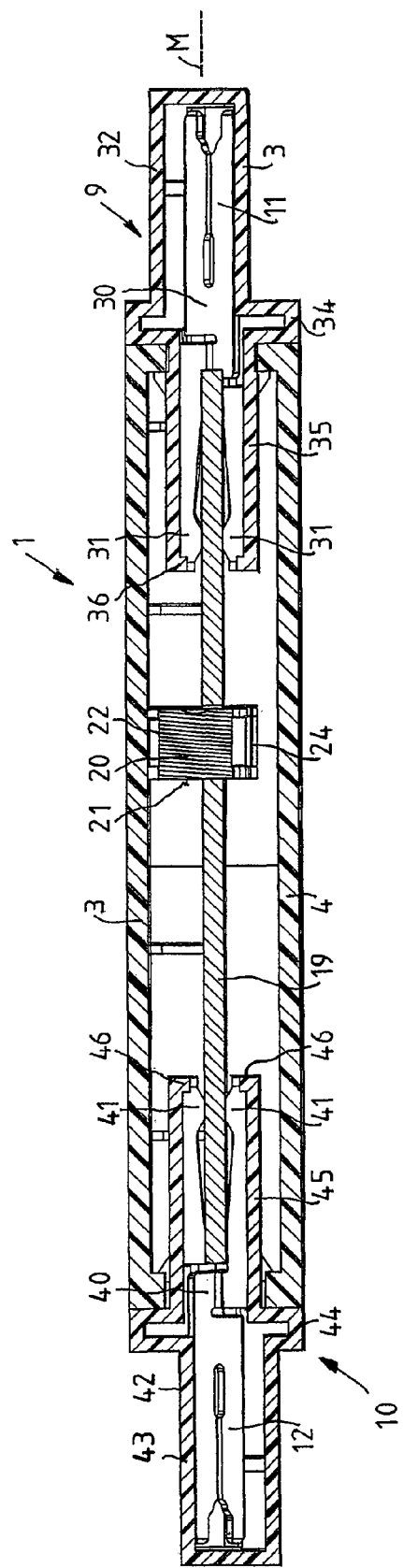

FIG. 3 shows a perspective front view of the distribution strip with the housing partially removed, FIG. 4 shows a perspective plan view of a printed circuit board with surge arresters, FIG. 5 shows a perspective view from below of a printed circuit board with surge arresters, FIG. 6 shows a side view of a printed circuit board with surge arresters, FIG. 7 shows a front view of a printed circuit board with surge arresters, FIG. 8 shows a sectional illustration through a distribution strip, with the section passing through both printed circuit board plug-type connectors.

Figure 9:
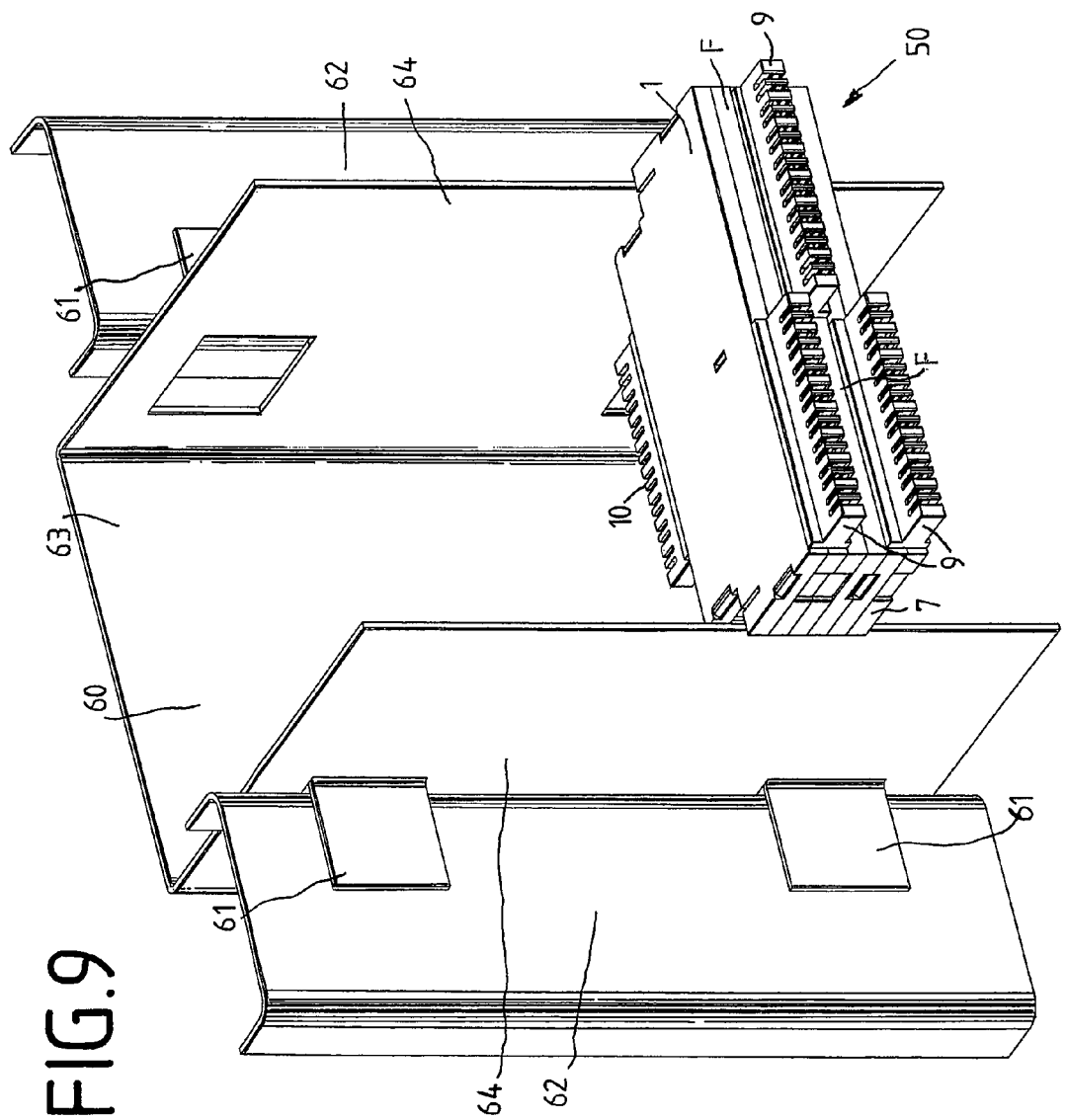
Figure 10:
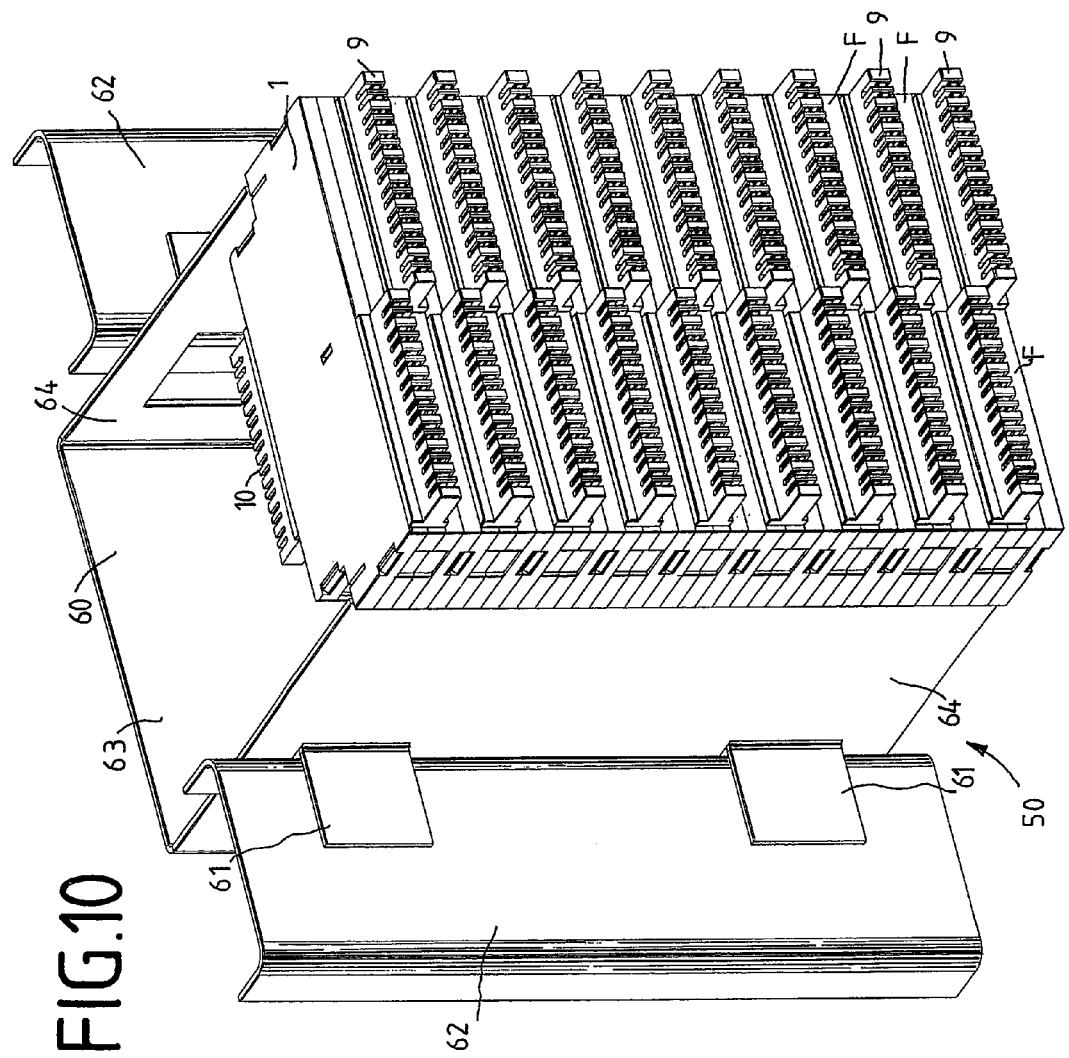

FIG. 9 shows a perspective front view of a distribution block comprising three distribution strips, and FIG. 10 shows a perspective front view of a distribution block comprising a fully populated mounting trough as carrier system.

Figure 1:
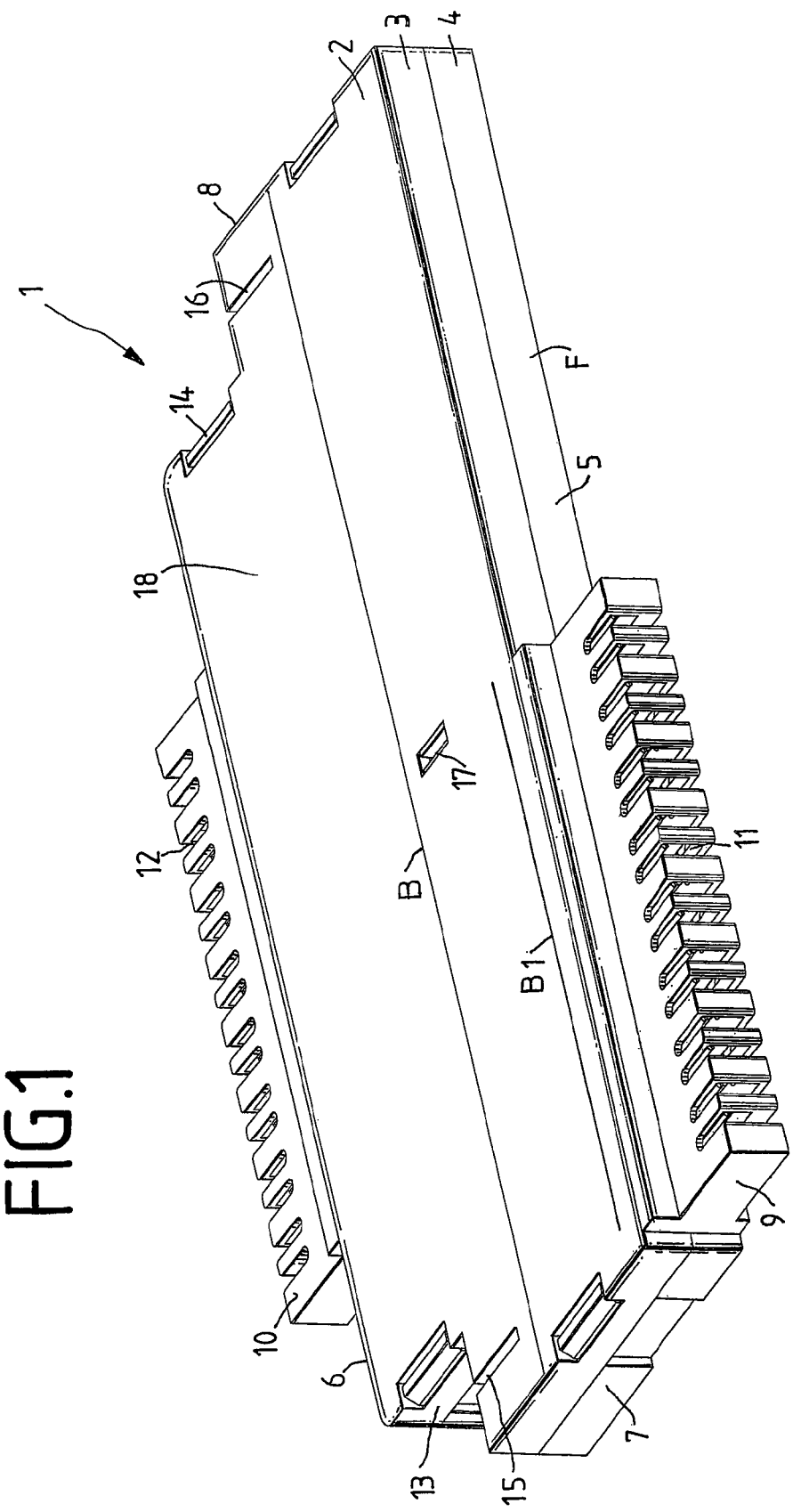
FIG. 1 shows a perspective front view of a distribution strip.
Figure 2:
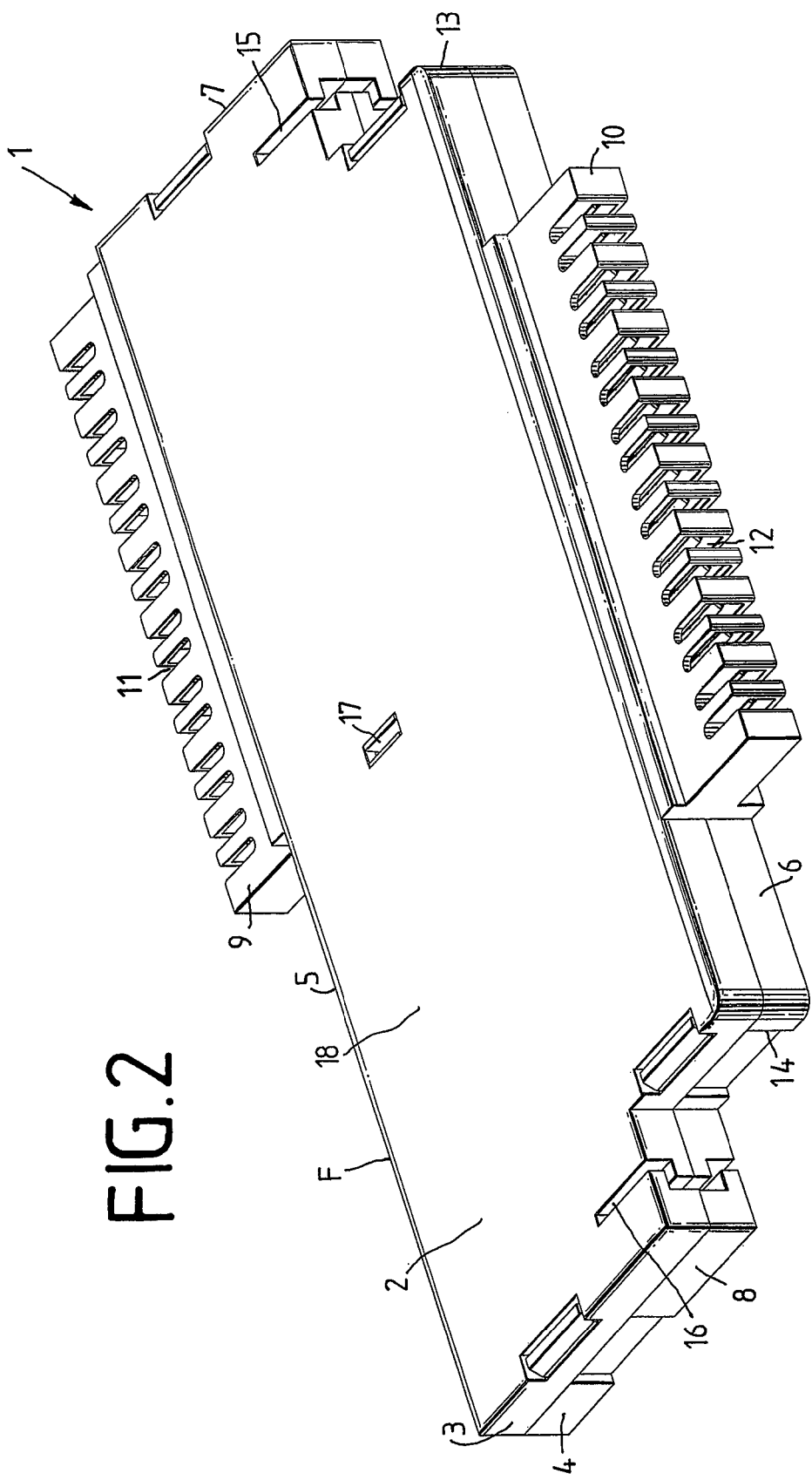
FIG. 2 shows a perspective rear view of the distribution strip.

FIG. 1 and FIG. 2 show a distribution strip 1. The distribution strip 1 comprises a housing 2, which has a housing upper part 3 and a housing lower part 4. The distribution strip 1 has a front side 5, a rear side 6, a left-hand side face 7 and a right-hand side face 8. A printed circuit board plug-type connector 9 is arranged on the front side 5. A printed circuit board plug-connector 10 is likewise arranged on the rear side 6. The printed circuit board plug-type connectors 9, 10 have an identical design and have sixteen contact elements 30, 40 (FIG. 8) in order to connect in each case eight twin cores. The contact elements 30, 40 each have two contacts, namely a core connection contact 11, 12 in the form of an insulation displacement contact and a printed circuit board contact 31, 41, by means of which the printed circuit board plug-type connector 9, 10 is electrically connected to a printed circuit board 19 arranged within the housing 2. The printed circuit board contact 31, 41 is preferably in the form of a fork contact. The core connection contacts 11, 12 are in this case accessible from the front side 5 and the rear side 6, respectively. The printed circuit board plug-type connector 9 is in this case arranged so as to be laterally offset towards the left and terminates virtually flush with the left-hand side face 7. The width B1 of the printed circuit board plug-type connector 9 is in this case less than/equal to half the width B of the front side 5. The right-hand half of the front side 5 is therefore free and can be used for various further functions, such as labeling, signaling, measurement and/or test contacts or wire guides, for example, The right-hand half therefore represents a free space or functional space F. In this case, the rear side 6 is narrower than the front side 5, i.e. has a smaller width B2. The printed circuit board plug-type connector 10 is in this case arranged centrally, i.e. symmetrically with respect to the side faces 7, 8 or the set-back faces 13, 14. Furthermore, the housing 2 has slots 15, 16, via which the distribution strip 1 can be plugged onto a trough, in which case preferably at the same time an electrical connection is produced between a grounding contact arranged in the housing 2 and the trough. Finally, a cutout 17 in an upper side 18 of the housing 2 is shown.

FIG. 3 illustrates the distribution strip 1 without the housing upper part 3, with the result that a printed circuit board 19 arranged within the housing 2 is shown. Eight surge arresters 20 are arranged on the printed circuit board 19. The surge arrester 20 has a cylindrical design and has two outer electrodes 21 and a central electrode 22. The surge arresters 20 are in this case arranged in slots 23 in the printed circuit board 19, with the width B3 of the slots 23 being slightly smaller than the diameter D of the surge arresters 20 (see also FIG. 4). The length of the slot 23 is matched to the length of the surge arrester 20, with the slot being slightly longer in the center in order that a failsafe contact 24 arranged on the surge arrester 20 can pass through the slot 23. The slot 23 is in this case dimensioned such that, taking into consideration the manufacturing tolerances for the surge arrester 20 and the slot 23, it is ensured that the surge arrester 20 does not slide through the slot 23. The aim of this is to bring the physical height h1 above the printed circuit board 19 and the physical height h2 below the printed circuit board 19 as close as possible to one another in order that the distribution strip has a low physical height overall (see also FIGS. 6 and 7). For example, the diameter of the surge arrester is 6 mm, with the height of the distribution strip being only 10 mm in total. When also taking into consideration the failsafe contact 24, the physical height of the distribution strip 1 is approximately 1.5× the physical height of the functional element (surge arrester+failsafe contact).

The end sides S of the slot 23 can in this case be metalplated in order to make contact with the external electrodes 21. The electrodes 21 can then be electrically connected to two contacts, associated with one another in pairs, of the printed circuit board plug-type connectors via conductor tracks (not illustrated). The printed circuit board 19 is in the form of a T and has an opening 25. A fixing lug 26 of the housing lower part 4 which fixes the printed circuit board 19 protrudes through the opening 25 (see FIG. 3). The fixing lug 26 is preferably resilient and has latching hooks 27. The fixing lug 26 is in this case preferably formed from a cut-free portion similar to the cutout 17. Correspondingly, the housing upper part 3 preferably also has a fixing lug, which latches with the fixing lug 26, for example.

The housing lower part 4 has various latching elements 28, by means of which the housing lower part 4 is latched to the housing upper part 3. Likewise, the printed circuit board plug-type connectors 9, 10 have latching elements 29, by means of which the printed circuit board plug-type connectors 9, 10 can be latched to the housing upper part 3 and the housing lower part 4, with only the latching elements 30 of the printed circuit board plug-type connector 10 for latching with the housing upper part 3 being shown in FIG. 3.

The design of the printed circuit board plug-type connectors 9, 10 will now be explained with reference to FIG. 8. The printed circuit board plug-type connector 9 comprises sixteen contact elements 30, which are preferably in the form of integral stamped, bent parts. The contact elements 30 each comprise the core connection contact 11 in the form of an insulation displacement contact and a printed circuit board contact 31 in the form of a fork contact. The housing 32 of the printed circuit board plug-type connector 9 has a first section 33, in which the core connection contact 11 is positioned. This first section 33 is adjoined by a second section 34 which is slightly wider and forms a stop edge on the housing upper part 3 and housing lower part 4. This second section 34 is adjoined by a third section 35, which is narrower than the first section 33 and in which the printed circuit board contacts 31 are arranged. The third section 35 has, at its end, inwardly pointing stops 36 for the fork contacts, with the result that the contact elements 30 are arranged in the housing 32 such that they cannot fall out. Thus, the contact elements 30 or the housing 32 can absorb connection forces which occur when the core connection contacts 11 are connected. In this case, the core connection contact s 11 and the fork contacts lie in one line. A mid-axis M of the core connection contacts 11 in this case lies in a central plane $E_M$ of the printed circuit board 19, with the central plane $E_M$ being illustrated in FIG. 7. In this case, the printed circuit board 19 is positioned centrally in the housing 2 of the distribution strip 1.

The second printed circuit board plug-type connector 10 has a corresponding design, with a contact element 40 with a core connection contact 12 and a printed circuit board contact 41, a housing 42 with a first section 43, a second section 44 and a third section 45 with stops 46.

The central electrodes 22 of the surge arresters 20 are connected to at least one common grounding line. In this case, the grounding line can be a conductor track on or in the printed circuit board 19 or else a separate grounding bus, which is clipped onto the surge arresters 20. Then, in each case one grounding contact is arranged in the region of the slots (15, 16) (not illustrated), via which grounding contact the grounding line or grounding bus is connected to a carrier system.

The design of a distribution block 50 will now be explained in more detail with reference to FIG. 9 and FIG. 10. The distribution block 50 comprises a carrier system 60 which is in the form of a trough which is in the form of a U in cross section, with the trough being fastened on two bay-type rails 62 by means of fastening elements 61 in the exemplary embodiment illustrated.

The trough comprises a base plate 63 and two side faces 64. In this case, the distribution strips 1 are plugged, alternately flush left or flush right, onto the side faces 64 of the trough by means of the slots 15, 16 in the distribution strips 1. In this case, the orientation of the uppermost distribution strip 1 in FIG. 9 corresponds to the illustration in FIG. 1, with the printed circuit board plug-type connector 9 being flush left with respect to the side face 64 or a side face 7 of the housing 2. The lowermost distribution strip 1 has a corresponding design. The central distribution strip 1, on the other hand, is aligned in such a way that the printed circuit board plug-type connector 9 is arranged flush right with respect to the side face 64. For this purpose, for example, the distribution strip is simply rotated through 180°. As a result, the free space F of the central distribution strip 1 is located between the printed circuit board plug-type connector 9 of the uppermost distribution strip 1 and the printed circuit board plug-type connector 9 of the lowermost distribution strip 1. Therefore, the core connection contacts 11 in the form of insulation displacement contacts can be wired using a tool, as described in EP 0 329 917 A1.

In this case, the printed circuit board plug-type connectors 10 or the core connection contacts 12 thereof are wired prior to being plugged onto the side faces 64. The printed circuit board plug-type connectors 9 can in this case likewise be wired prior to being plugged on, but can also be wired after having been plugged on.

Finally, the fully populated distribution block 50 with eighteen distribution strips 1 is illustrated in FIG. 10, with the result that in total 144 twin cores can be connected per side.

LIST OF REFERENCE SYMBOLS

1 Distribution strip
2 Housing
3 Housing upper part
4 Housing lower part
5 Front side
6 Rear side
7 Left-hand side face
8 Right-hand side face
9 Printed circuit board plug-type connector
10 Printed circuit board plug-type connector
11 Core connection contact
12 Core connection contact
13 Set-back face
14 Set-back face
15 Slot
16 Slot
17 Cutout
18 Upper side
19 Printed circuit board
20 Surge arrester
21 Electrode
22 Central electrode
23 Slot
24 Failsafe contact
25 Opening
26 Fixing lug
27 Latching hook
28 Latching element
29 Latching element
30 Latching element
31 Printed circuit board contact
32 Housing
33 First section
34 Second section
35 Third section
36 Stop
40 Contact element
41 Printed circuit board contact
42 Housing
43 First section
44 Second section
45 Third section
46 Stop
50 Distribution block
60 Carrier system
61 Fastening element
62 Bay-type rail
63 Base plate
64 Side face
B Half width
B1 Width B2 Width
B3 Width
D Diameter
$E_M$ Central plane
h1 Physical height
h2 Physical height
M Mid-axis
S End side

The invention claimed is:

1. A distribution strip for telecommunications and data technology, the distribution strip comprising:
a housing having side faces extending between a front side and a rear side; and
front connection contacts for cores accessible from the front side and rear connection contacts for cores accessible from the rear side, the front connection contacts being electrically connected to the rear connection contacts,
the front connection contacts being laterally offset towards one of the side faces of the housing and extending at most as far as half a width of the front side.

2. The distribution strip as claimed in claim 1, wherein the front connection contacts are in the form of insulation displacement contacts.

3. The distribution strip as claimed in claim 1, wherein the rear connection contacts are in the form of insulation displacement contacts.

4. The distribution strip as claimed in claim 1, wherein the rear connection contacts are arranged symmetrically with respect to the side faces of the housing.

5. The distribution strip as claimed in claim 1, wherein a printed circuit board is arranged in the housing, with the front connection contacts and the rear connection contacts being electrically connected to one another via said printed circuit board.

6. The distribution strip as claimed in claim 5, wherein the printed circuit board is arranged centrally in the housing.

7. The distribution strip as claimed in claim 5, wherein the front connection contacts and/or the rear connection contacts are connected to the printed circuit board via fork contacts.

8. The distribution strip as claimed in claim 5, wherein functional elements are arranged on the printed circuit board, said functional elements being arranged in slots in the printed circuit board.

9. A distribution block, comprising:
a carrier system,
a plurality of distribution strips fastened on the carrier system, each of the distribution strips including a housing having side faces extending between a front side and a rear side; and front connection contacts accessible from the front side and rear connection contacts accessible from the rear side, the front connection contacts being electrically connected to the rear connection contacts, the front connection contacts being laterally offset towards one of the side faces of the housing and extending at most as far as half a width of the front side;
wherein the distribution strips are arranged one below the other, the front connection contacts being arranged alternately flush left or flush right.

10. The distribution block as claimed in claim 9, wherein the front connection contacts include insulation displacement contacts.

11. The distribution block as claimed in claim 9, wherein the rear connection contacts include insulation displacement contacts.

12. The distribution block as claimed in claim 9, wherein the rear connection contacts are arranged symmetrically with respect to the side faces of the housing.

13. The distribution block as claimed in claim 9, wherein a printed circuit board is arranged in the housing, with the front connection contacts and the rear connection contacts being electrically connected to one another via said printed circuit board.

14. The distribution block as claimed in claim 13, wherein the printed circuit board is arranged centrally in the housing.

15. The distribution block as claimed in claim 13, wherein the front connection contacts and/or the rear connection contacts are connected to the printed circuit board via fork contacts.

16. The distribution block as claimed in claim 13, wherein functional elements are arranged on the printed circuit board, said functional elements being arranged in slots in the printed circuit board.

* * * * *